E. REMILLARD.
BRICK-YARD TRUCK.

No. 189,058. Patented April 3, 1877.

Inventor:
Edward Remillard

Attest;
John H. Radstone
John R. Gilman

UNITED STATES PATENT OFFICE.

EDOUARD REMILLARD, OF OAKLAND, CALIFORNIA.

IMPROVEMENT IN BRICK-YARD TRUCKS.

Specification forming part of Letters Patent No. 189,058, dated April 3, 1877; application filed December 18, 1874.

*To all whom it may concern:*

Be it known that I, EDOUARD REMILLARD, of Oakland, in the county of Alameda and State of California, have invented a Brick-Yard Truck, of which the following is a specification:

The object of my invention is to preserve and improve the floor of brick-yards while transporting brick and other material across the same; also, to secure a more ready and convenient means of moving loads about the yard.

The nature of my invention will be more fully understood by reference to the accompanying drawings, and the letters marked thereon.

Figure 1:
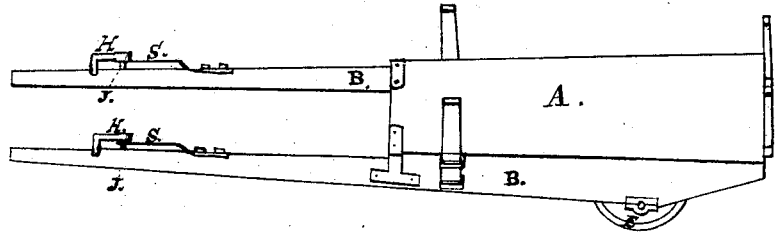
Figure 2:
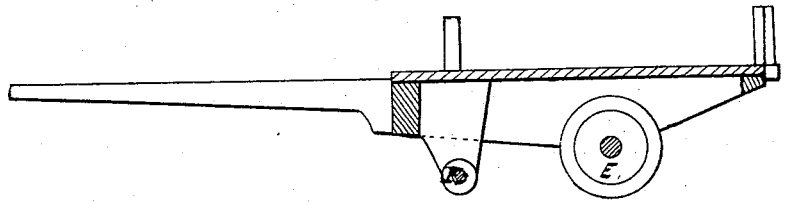
Figure 3:
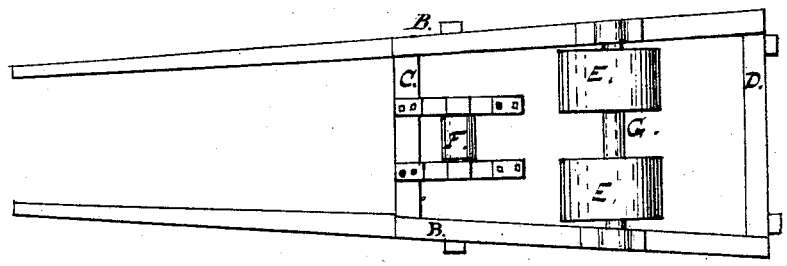
Figure 4:

Figure 1 is a perspective view; Fig. 2, a longitudinal sectional elevation; Fig. 3, an under plan view; and Fig. 4 a section, showing the hook used for attaching the truck to the gear of the horse.

My improved brick-yard truck is supported on two broad rollers, E E, Fig. 3, which extend nearly the whole length of the main axle G, and thus by their broad tread are not liable to sink into the floor of the brick-yard, even when the same is softened by rain. A central roller, F, is placed in line between the two rollers, G, so that the three rollers cover the entire width of the truck-frame, and when the truck is used as a hand-harrow the floor of the brick-yard may be kept smooth like a floor, while the truck is easily moved.

The side rails B B are very wide or deep to give strength at the axle G, and rounded in front to give convenient shape for hand use or for a horse, if desired. These shafts are connected by the cross-bars C and D, upon which the floor A is supported in the usual manner.

The shafts are provided with the hooks H, spring S, and catch-bolt J, for attaching the saddle-chain, in the usual manner.

The axle G revolves with the rollers E E in journal-boxes in the side rails or shafts B.

The above-described construction is very simple, having the two shafts B and two cross-bars, C and D, with the two main trucks on the axle G, and a central roller, F, with sufficient tread to enable the three rollers to cover and roll down the whole space from side to side of the truck.

I do not broadly claim rollers or trucks with a broad tread; but I believe that the above-described truck possesses many advantages.

Having described my invention, I claim—

The above-described truck, having shafts B, rollers E E, axle G, and central roller F, said three rollers being arranged to support and balance the load, and their tread covering the track of the truck, thus rolling the ground smooth, substantially as set forth.

EDOUARD REMILLARD.

Witnesses:
JOHN H. REDSTERN,
JOHN R. GILMAN.